Figure 1:
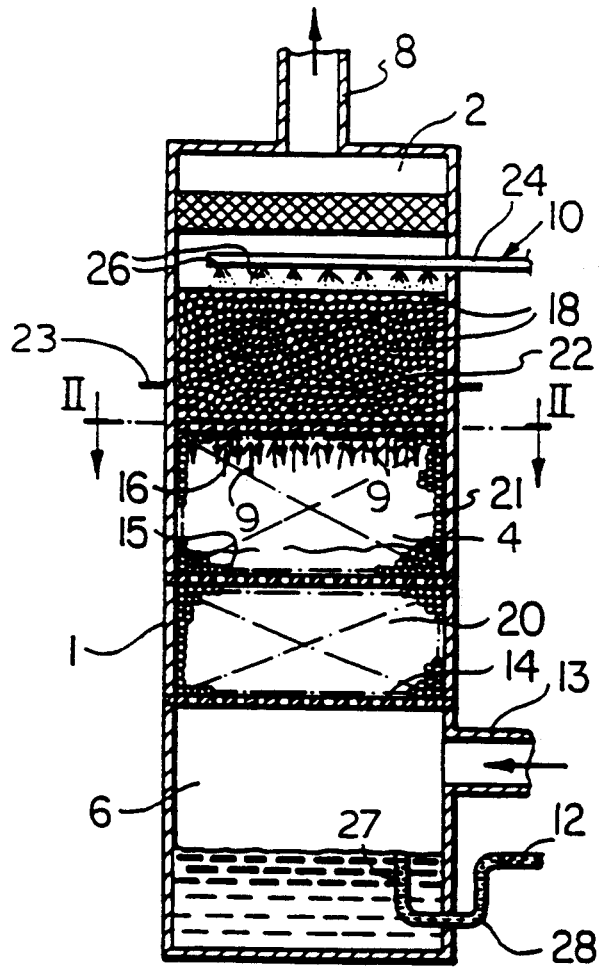

United States Patent [19]
Chuang

[11] Patent Number: 5,387,377
[45] Date of Patent: Feb. 7, 1995

[54] ACTIVE LIQUID DISTRIBUTOR CONTAINING PACKED COLUMN

[75] Inventor: Karl T. Chuang, Edmonton, Canada

[73] Assignee: The Governors of the University of Alberta, Edmonton, Canada

[21] Appl. No.: 94,103
[22] PCT Filed: Feb. 5, 1992
[86] PCT No.: PCT/CA92/00049
§ 371 Date: Jul. 27, 1993
§ 102(e) Date: Jul. 27, 1993
[87] PCT Pub. No.: WO92/13620
PCT Pub. Date: Aug. 20, 1992

[30] Foreign Application Priority Data
Feb. 5, 1991 [CA] Canada .................. 2035701

[51] Int. Cl.$^6$ .............................. B01F 3/04
[52] U.S. Cl. ..................... 261/97; 261/114.1
[58] Field of Search ............ 261/97, 98, 94, 114.1

[56] References Cited

U.S. PATENT DOCUMENTS

| | | |
|---|---|---|
| 2,639,130 | 5/1953 | Heere . |
| 3,996,317 | 12/1976 | Sarmiento et al. ............ 261/113 |
| 4,159,291 | 6/1979 | Bruckert et al. ............ 261/114.1 |
| 4,185,075 | 1/1980 | Ellis et al. .................. 261/113 |
| 4,310,475 | 1/1982 | Leva .......................... 261/113 |
| 4,504,426 | 3/1985 | Chuang et al. ............ 261/114.1 |
| 4,620,952 | 11/1986 | Hsieh . |
| 4,820,456 | 4/1989 | Kiselev . |
| 4,956,127 | 9/1990 | Binkley et al. ............ 261/114.1 |

FOREIGN PATENT DOCUMENTS 233878 5/1925 United Kingdom ............ 261/97
1488606 10/1977 United Kingdom .

OTHER PUBLICATIONS

"Performance of Combined Mesh Packing and Sieve Tray in Distillation", G. X. Chen et al, pp. 382–386, Canadian Journal of Chem. Engr., vol. 68, Jun. 1990.

"Better sieve tray? Add packing", S. H. Salem and A. A. Alsaygh, pp. 76-G—76-H, Hydrocarbon Processing, May 1988.

"Troubleshooting A Packed Vacuum Column", B. D. McMullan, pp. 1-13, Aiche Chicago Meeting, Nov. 11-16, 1990.

Primary Examiner—Tim Miles
Attorney, Agent, or Firm—Bell, Seltzer, Park & Gibson

[57] ABSTRACT

An active liquid distributor containing, packed column wherein a casing contains perforated, active liquid frothing plates directly supporting packed beds filling the whole of the gas flow path in the casing. The total perforated, cross-sectional area, and the cross-sectional area of each perforation, for each plate is chosen to match the permeability of the packed beds so that the plates and packed beds contribute significantly to the gas/liquid contact thus greatly increasing the mass transfer efficiency of the packed column.

8 Claims, 3 Drawing Sheets

ACTIVE LIQUID DISTRIBUTOR CONTAINING PACKED COLUMN

This invention relates to an active liquid distributor containing, packed column. The present invention is particularly useful for mass transfer operations, such as, for example, distillation, absorption stripping and liquid extraction.

It has already been proposed in, for example, U.S. Pat. No. 2,639,130, dated May 19, 1953 "Apparatus For Equalizing Distribution In packed Columns" P. N. Heere, to provide successive, radially extending vane distributors in a packed column to intercept liquid flowing toward the column wall and to return it to definite predetermined points across the column. This compensates for the action of the upflowing phase, the resistance of the column wall, surface tension and the action of the packing itself, causing the liquid to have a tendency to flow outwardly to the column wall and then down the wall, and thus escaping direct contact with the upwardly flowing gaseous phase.

While the packed columns of Heere are useful,
(1) the distributors contribute little to increasing the gas/liquid contact and mass transfer,
(2) the distributors do not evenly distribute the downward flow of liquid through the packed bed,
(3) the distributors may become flooded and cause maldistribution of the liquid and lower the gas/liquid contacting efficiency of the column.

It has already been proposed in, for example, U.S. Pat. No. 4,504,426, dated Mar. 12, 1985. "Gas-Liquid Contacting Apparatus", K. T. Chuang et al, to provide perforated, liquid distributing and frothing trays at different levels in a gas-liquid contacting column. Perforated trays generally of this type have been used in upwardly extending, liquid distributing spaces which separate packed beds in a packed column. It has always been considered essential for the perforated trays to be placed in these spaces, which separate packed beds and contribute nothing to the mass transfer between the gas and the liquid, in order to provide unobstructed flow of liquid across the perforated trays to ensure uniform liquid distribution across the perforated trays which is essential for maintaining uniform wetting of the packing.

In a recent paper entitled "Troubleshooting a Packed Vacuum Column", the authors, McMullan et at. presented the results of tests on a packed vacuum column at AIChE Annual Meeting in Chicago on Nov. 11–16, 1990. The authors concluded from the results that the development of uneven liquid distribution in a packed column is inevitable and, for best performance, liquid should be remixed in packing free portions of the column at different levels between the packed beds therein.

It has also been proposed in "Better sieve tray? Add packing" A-B.S.H. Salem et al, Hydrocarbon Processing, May 1988, p. 76-G, and "Performance of Combined Mesh Packing and Sieve Tray in Distillation" to add a shallow bed of packing material on top of sieve trays to increase the efficiency of a sieve tray tower. This development was also investigated by me in Chen et al, "Performance of Combined Mesh Packing and Sieve Tray in Distillation", Cdn. J. of Chem. Eng., Vol 68, June 1990. The systems investigated in these articles did not provide for distribution of liquid onto the underlying packing because the development relied on the use of sieve trays. As is appreciated this type of tray provides solely for transverse flow of liquid across the tray towards its downcomer and thereby provides a transverse distribution of liquid in the packing. As the liquid flows across the tray, vapour bubbles upwardly through the transversely flowing liquid to develop a froth. It is difficult to maintain a level of froth in the packing but for the purposes described in these articles an improvement in performance was noted.

There is a need for a packed column wherein instead of standard perforated trays for supporting packing, or other types of perforated trays in spaces between packed beds, or inactive distributors, i.e. the distributors are inactive by insignificantly contributing to the gas/liquid contact, active distributors are provided, which significantly contribute to the gas/liquid contact, at the same time provide direct support for the packing, and provide good liquid remixing.

According to the present invention there is provided a packed column for use in gas/liquid mass transfer operations, which includes:
 a) an upwardly extending casing having,
  i) an upper, liquid receiving, casing interior portion,
  ii) an intermediate, casing interior portion forming a flow path for the flow of active liquid downwardly therethrough and the flow of gas upwardly therethrough, and
  iii) a lower, liquid collecting, casing interior portion.
 b) a gas outlet from the casing above the liquid receiving, casing interior portion,
 c) means for distributing liquid across the liquid receiving, casing interior portion,
 d) a liquid outlet from the liquid collecting, casing interior portion,
 e) a gas inlet to the liquid collecting, casing interior portion,
 f) a series of spaced apart porous trays partitioning transversely the whole of the flow path in the intermediate, interior portion at different levels, each tray being perforated across the partitioning area thereof, and for directly supporting a packed bed thereon,
 g) a plurality of discrete, gas/liquid contacting, packing elements supported on each tray,
 h) the improvement comprising:
 i) the packing elements forming packed beds, with each packed bed filling the whole of the partitioned part of the intermediate, casing interior portion above the tray on which that packed bed is supported, and
 ii) the trays are active liquid frothing and distributing trays, to provide in operation a desired degree of controlled liquid level on each tray to promote frothing above the tray and within the packing whereby each tray, together with substantially the whole of each packed bed, and thus substantially all of the intermediate casing interior portion, contributing significantly to gas/liquid contact in the casing.

Figure 2:
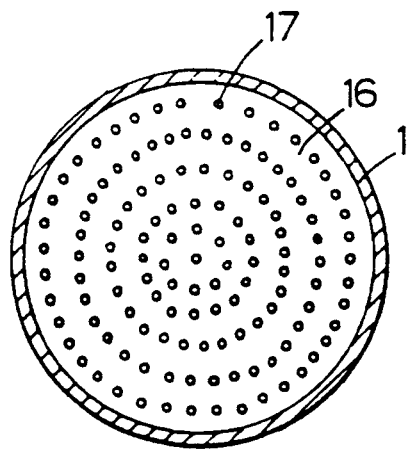
Figure 4:
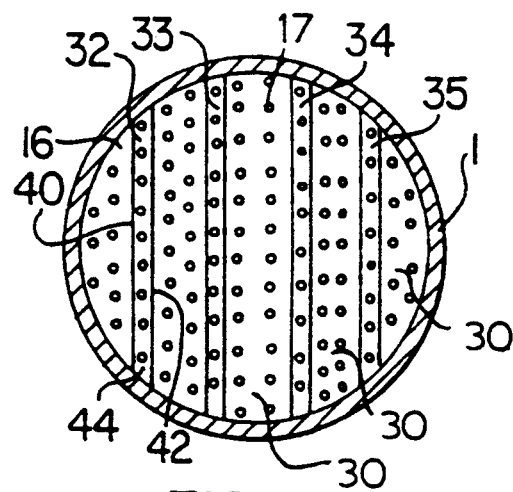
Figure 3:
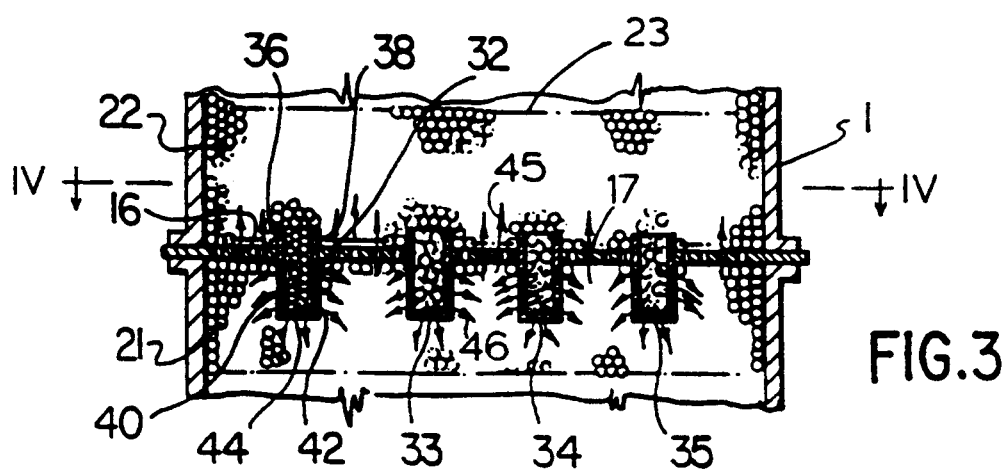
Figure 5:
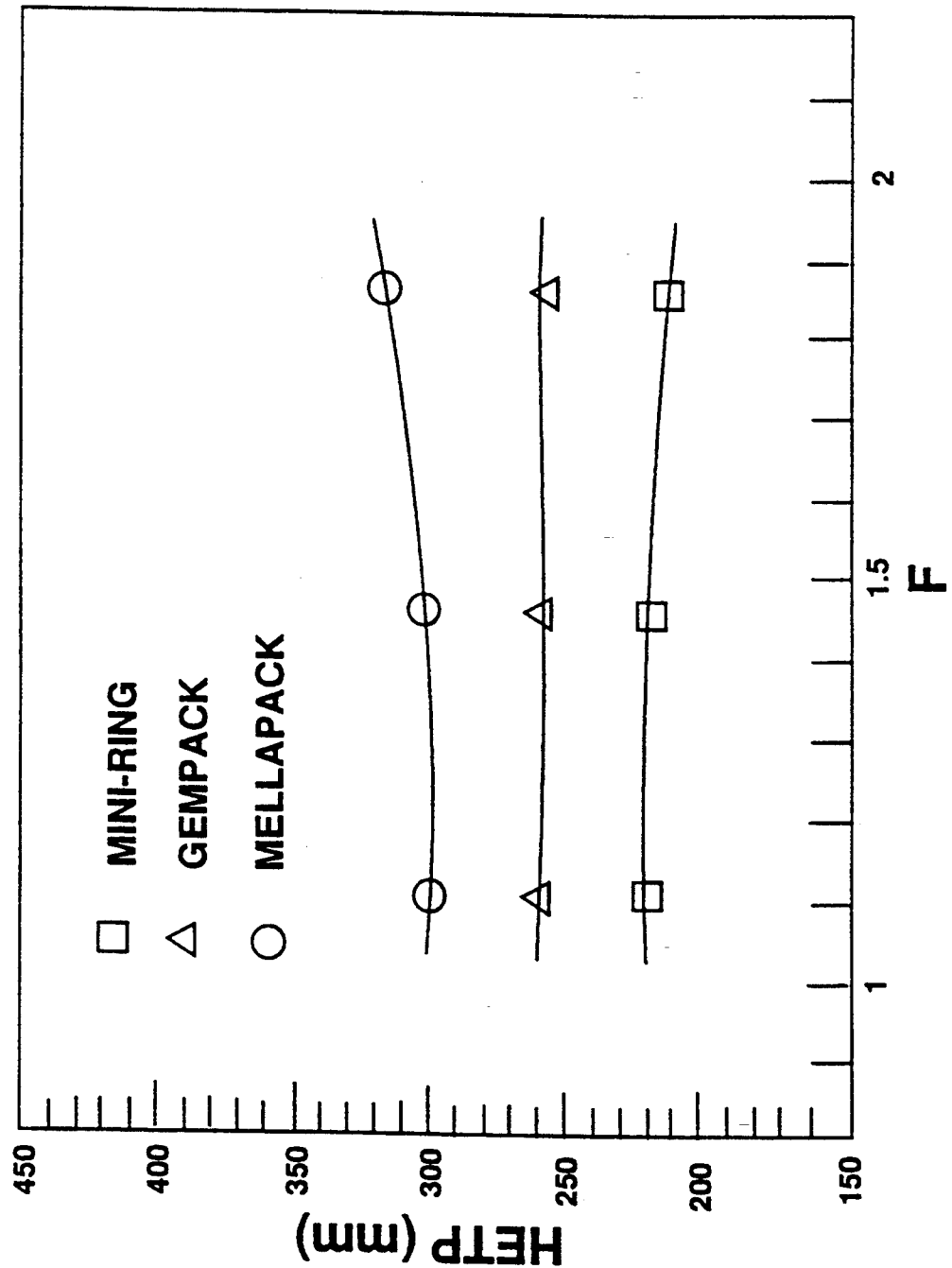
Figure 6:
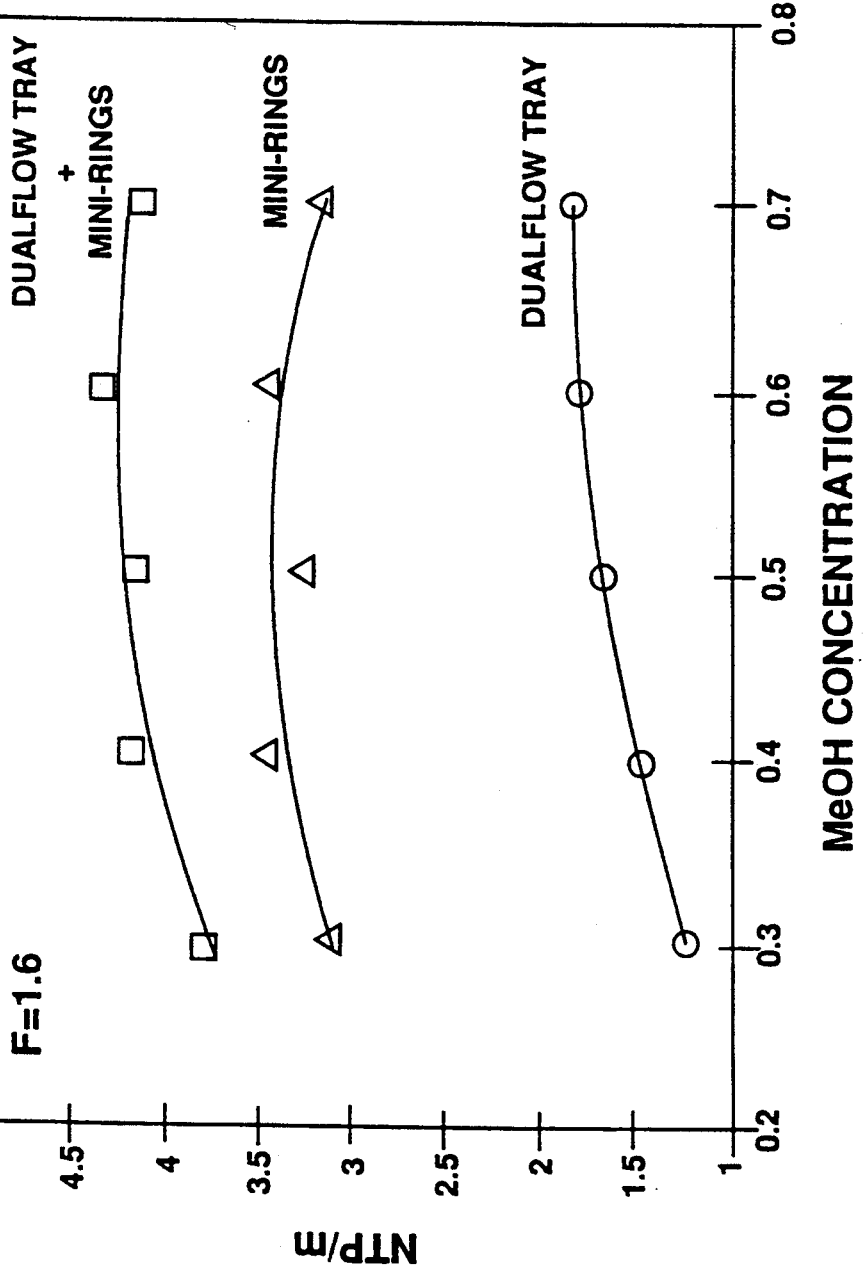

In the accompanying drawings which illustrate, by way of example, embodiments of the present invention,
FIG. 1 is a diagrammatic side view of a liquid distributing, packed column.
FIG. 2 is a plan view along II—II, FIG. 1,
FIG. 3 is a similar view to FIG. 1 but of an upwardly extending portion of a different packed column,
FIG. 4 is a view along IV—IV, FIG. 3 with the packing,
FIG. 5 is a graph showing effectiveness of different types of packing, and
FIG. 6 is a graph showing mass transfer performance of various tower designs.

In FIGS. 1 and 2 there is shown a preferred embodiment of an active, liquid distributor containing, packed column, which includes:

a) an upwardly extending casing 1, having,
i) an upper, liquid receiving, casing interior portion 2,
ii) an intermediate, casing interior portion 4 forming a flow path for the flow of active liquid downwardly therethrough and the flow of gas upwardly therethrough, and
iii) a lower, liquid collecting, casing interior portion 6,
b) a gas outlet 8 from the casing 1 above the liquid receiving, casing interior portion 2,
c) means 10 for distributing liquid across the liquid receiving, casing interior portion 2,
d) a liquid outlet 12 from the liquid collecting, casing interior portion 6 which in operation, is sealed against the escape of gas therethrough,
e) a gas inlet 13 to the liquid collecting casing interior portion,
f) a series of porous trays, 14 to 16, partitioning transversely the whole of the flow path in the intermediate, casing interior portion 4 at different levels, each tray 14 to 16 being perforated across the whole partitioning area thereof, and for directly supporting a packed bed thereon and, in operation, together with the packed bed supported directly thereabove, distributing active liquid across any packed bed therebelow, and
g) a plurality of discrete, gas/liquid contacting, packing elements 18 supported on each try 14 to 16, and wherein the improvement comprises,
i) the packing elements 18 form packed beds 20 to 22, with each packed bed 20 to 22 filling the whole of the partitioned part of the intermediate, casing interior portion 4 above the tray 14 to 16 on which that packed bed 20 to 22 is supported,
ii) the trays are active liquid frothing and distributing trays, to provide in operation, a desired degree of controlled liquid level on each tray to provide frothing above the tray and within the packing whereby each tray 14 to 16, together with substantially the whole of each packed bed 20 to 22, and thus substantially all of the intermediate, casing interior portion 4, contributing significantly to gas/liquid contact in the casing 1.

The device 10 for distributing liquid across the liquid receiving, casing interior portion 2 comprises a pipe 24 with space apart liquid spray nozzles 26 to distribute liquid across the top of the packing.

The liquid outlet 12 comprises a pipe 27 with a U-shape trap 28 forming a liquid seal at the tower base to facilitate liquid removal and prevent escape of vapour through the pipe 27.

In operation, liquid is sprayed on to the uppermost packed bed 22 while gas is fed through the inlet 13 and upwardly through the lowermost packed bed 20.

The liquid trickles downwardly through the packed beds 20 to 22 in the direction of arrow 7 while the gas passes upwardly through them in the direction of arrows 9 to demonstrate the counterflow aspect of the vapour and liquid flows.

At each of the trays 14 to 16, the gas passing upwardly through the perforations in the trays causes liquid immediately above them to be frothed to a level generally indicated at 23. It has been discovered that significant benefit can be derived from developing a significant froth height in the packing above the respective tray. According to this invention, the feature of frothing can only be accomplished by using an active liquid frothing and distributing tray. The term active is intended to distinguish the subject tray from tray designs which do not promote or sustain a frothing action. Active trays would naturally exclude the use of perforated trays which do not provide for a controlled hold-up of liquid on the tray because upwardly flowing vapour can not develop a froth in the packing above the tray. Such trays which do not normally provide for liquid hold-up are the common packing support tray which has relatively large perforations which allow the liquid to flow freely therethrough yet retain the packing pieces above the tray. Furthermore, trays which preclude or inhibit frothing by other means are excluded. Such trays would include those which only provide for an upflow of vapour through the tray with little or no downflow of liquid through the tray, for example, sieve trays and bubble cap trays which include transverse flow of liquid across the entire tray toward a downcomer to the corresponding side of the next tray are excluded.

Acceptable active trays are therefore of a category which can develop the desired degree of frothing in the packing while allowing liquid to flow downwardly through the tray onto packing immediately beneath the tray. The tray has a sufficient number of perforations or apertures to provide for adequate re-distribution of downflowing liquid over the immediately underlying packing. It is appreciated that a variety of tray configurations with aperture designs can be provided to accomplish this feature of an active type of tray. As a guideline the tray configuration can be best characterized according to a preferred embodiment of the invention where the perforated area of the tray can be in the range of 10% to 40% of the cross-sectional area of the tower which is partitioned by the tray. Exemplary types of trays are shown in FIGS. 2 and 4. The aperture sizing is preferably in the range of 0.125 to 1.0 in. (3.2 to 25.4 mm). The tray of FIG. 2 is similar to the types of support trays commonly used at the base of a packed tower, only the modified extent of perforations and size of perforations are formed in a manner so as to be within the above ranges. The tray of FIG. 4 is similar to the tray of FIG. 2, only the section is modified across its surface to provide parallel rows of downcomer troughs. Most of liquid flows downwardly through the downcomers and is distributed over the underlying bed, while vapour flows upwardly through the perforated plate portions between the downcomers. The downcomers are provided with weirs to hold back on the tray sufficient liquid to develop the desired froth height above the tray and within the packing. With reference to the tower of FIG. 1, the packed beds 20 to 22 fill the whole of the partitioned spaces of the intermediary casing interior portion 4, and the amount of perforated area of, and the cross sectional areas in the, perforated trays 14 to 16 are chosen to provide a desired degree of controlled liquid level on each tray to promote frothing above the tray and within the packing so that each active tray 14 to 16, together with substantially whole of each packed bed 20 to 22, contributes significantly to gas/liquid contact within the casing 1.

For best results, each tray 14 to 16 has a perforated area within the aforementioned range, that is the preferred more limited range 20% to 40% of the cross-sectional area partitioned by that tray, and perforations 17 as shown in FIG. 2 having a diameter in the range 0.125 to 1.0 ins (3.2 to 25.4 mm). With this type of active plate structure, the desired froth heights 23 are achieved and maintained during operation as well as the desired distribution of downflowing liquid.

Also for best results, the trays 14 to 16 partition the flow path in the casing 1 at heights in the range of 10 to 80 ins. (250 to 2000 mm).

The preferred packings include random type packings, e.g. Glitsch®, Mini-rings®, Norton®, metal Intalox saddles®, and ordered-bed type packings, e.g. Koch®, Flexpac®, York mesh®, Glitsch®, Goodloc®, and Sulzer Bx® packings.

In FIGS. 3 and 4 as previously described, the trays 14 to 16 are according to an alternative embodiment of this invention, provided with downcomers such as the downcomers 32 to 35 shown for tray 16. Each downcomer 32 to 35 has overflow weirs, such as overflow weirs 36 and 38, and perforated side plates and bottom plates, such as side plates 40 and 42 and bottom plate 44. The arrangement for the plate functions in the same manner as the plate of FIG. 2. The weirs 36 and 38 are of sufficient height to hold-up liquid on the tray surface above perforated portions 30 between respective downcomer troughs so that upwardly flowing vapour through apertures 17 in the direction of arrows 45 develop the desired froth height in the packing as generally designated at level 23 of FIG. 3. The number of downcomer troughs 32 through 35 are selected for the size of tray to provide adequate distribution of downflowing liquid over packing located immediately beneath the tray. As demonstrated by arrows 46, the downcomer troughs direct the flow of liquid in a dispersed manner so as to distribute the downflowing liquid substantially evenly over the underlying packing.

Tests to verify the present invention were made using a 30-cm diameter methanol/water distillation column which had 5 trays, adjacent trays being spaced apart by 46 cm. The tests showed that, at low methanol concentrations for a multiple of 20% perforation dual-flow trays of the type shown in FIG. 2 combined with 46 cm beds packed with 25 mm Mini-rings, the Height Equivalent to a Theoretical plate (HETP) was 12 in. as compared with an HETP value of 30 in. for the same packing but equipped with conventional packing support plate. The results indicated that the present invention can improve the packed column efficiency by a factor of 2.5 which is the ratio of HETP of the prior art to the HEPT of this invention i.e.: 30/12.

Further tests were conducted to demonstrate the improvements in columns efficiencies provided by this invention. A column of the type shown in FIG. 1 was used to separate a methanol (MeOH) and water ($H_2O$) mixture. The effectiveness of various packings was investigated to determine the best packing for the tower. The results of FIG. 5 indicate the best packing to be the mini-rings based on the lowest value for the height equivalent to a theoretical plate (HETP) of the packing. In FIG. 5, the F-factor is an expression of gas kinetic energy which is defined as $Uv\sqrt{Pv}$ where $Uv$ is vapour velocity in m/s and $Pv$ is vapour density in $kg/m^2$. The results in operating the tower under various conditions including with or without the preferred mini-rings is shown in FIG. 6. A comparison of the performance is provided of the dual flow tray of FIG. 2, a column of mini-rings without any separating trays and the invention which consisted of the dual flow trays and full packing of the spaces between trays with the mini-rings.

In FIG. 6, the NTP/m is equal to the number of theoretical plates per meter which is the inverse of HETP i.e.: 1/HETP. The plot of the data derived from operating the tower under the above conditions is done for a value of F=1.6. From FIG. 6, the increase in performance is more than a factor of 2 in comparing the dual flow tray to this invention of the tray with full mini-ring packing. The invention also performs better than standard packing of mini-rings by a factor of at least 1.3.

Although not indicated on the graph of FIG. 6, the performance of a sieve tray having a layer of packing thereon as suggested by Chen et al (supra) is approximately 1.1 times more effective than the operation of the dual flow tray without packing. Hence the arrangement of this invention provides an increase in performance over Chen et al (supra) by a factor of 2 or greater. This is an extremely significant development in the field of mass transfer when one compares the 200% benefit versus a 10% increase in efficiency which is normally considered quite significant.

According to this invention, the positioning of active liquid frothing and distributing trays throughout the column provides for a more frequent re-distribution of downflowing liquid while enhancing the gas/liquid contact throughout the height of the column. Unlike normal systems which would include liquid distributors every 6 to 8 m in a tower, the system of this invention provides a distributor inherent in the active tray, every 0.3 to 0.5 m. As already noted, the active tray may be of the type shown in FIGS. 2 and 4 where it is understood that the downcomer tray of FIG. 4 is more useful in large diameter applications e.g. in excess of 1 m diameter or in large liquid downflow rates.

Although preferred embodiments of the invention are described herein in detail, it will be understood by those skilled in the art that variations may be made thereto without departing from the spirit of the invention or the scope of the appended claims.

I claim:

1. A packed column for use in gas/liquid mass transfer operations, said column including:
   a) an upwardly extending casing having,
      i) an uppermost liquid receiving, casing interior portion,
      ii) an intermediate, casing interior portion forming a flow path for the flow of active liquid downwardly therethrough and the flow of gas upwardly therethrough, and
      iii) a lower, liquid collecting, casing interior portion,
   b) a gas outlet from the casing above the liquid receiving, casing interior portion,
   c) means for distributing liquid across the liquid receiving, casing interior portion,
   d) a liquid outlet from the liquid collecting, casing interior portion,
   e) a gas inlet to the liquid collecting, casing interior portion,
   f) a series of spaced apart porous trays partitioning transversely the whole of the flow path in the intermediate casing interior portion at different levels, each tray having perforations across the whole partitioning area thereof, and for supporting a packed bed thereon,
   g) a plurality of discrete, gas/liquid contacting, packing elements supported on each tray,
   h) the improvement being characterized in that:
      i) the packing elements forming packed beds with each packed bed filling the whole of the partitioned part of the intermediate, casing interior portion above the tray on which that packed bed is supported, and ii) the trays are active liquid frothing and distributing trays, to provide in operation a desired degree of controlled liquid level on each tray to promote frothing above the tray and within the packing whereby each tray, together with substantially the whole of each packed bed, and thus substantially all of the intermediate, casing interior portion, contributing significantly to gas/liquid contact in the casing, iii) each of said trays providing said desired degree of controlled liquid level by virtue of a perforated area in the tray which permits downflow of liquid while retaining on said plate said liquid level whereby upward flow of vapours through said perforated area causes frothing of said liquid in said packing and iv) each tray including a plurality of parallel spaced apart troughs having perforated sides to distribute the liquid into the packing, with weirs to define a plurality of downcomers in said tray, said weirs being of a height to develop and maintain a sufficient liquid level which is frothed by the upflowing vapours.

2. A packed column according to claim 1, wherein each tray has a perforated area in the range 10% to 40% of the cross sectional area partitioned by that tray.

3. A packed column according to claim 1, wherein the perforations have a diameter in the range of 3.2 to 25.2 mm.

4. A packed column according to claim 1 wherein the perforated area is in the range of 20% to 40%.

5. A packed column according to claim 1, wherein the trays partition the flow path in the casing at heights in the range of 20 to 200 cm.

6. A packed column according to claim 1 wherein said packing is selected from the group consisting of mini-rings, saddles and ordered type packings.

7. A packed column according to claim 6 wherein said packing is mini-rings.

8. A packed column according to claim 7 wherein mass transfer performance of said tray and packing is in the range of 4 theoretical plates per meter.

* * * * *